US009336330B2

(12) United States Patent
Connor et al.

(10) Patent No.: US 9,336,330 B2
(45) Date of Patent: May 10, 2016

(54) ASSOCIATING ENTITIES BASED ON RESOURCE ASSOCIATIONS

(71) Applicant: Google Inc., Mountain View, CA (US)

(72) Inventors: James T. Connor, Mountain View, CA (US); Alexandre A. Verstak, Cupertino, CA (US); Anurag Acharya, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 13/944,775

(22) Filed: Jul. 17, 2013

(65) Prior Publication Data

US 2015/0169579 A1    Jun. 18, 2015

Related U.S. Application Data

(60) Provisional application No. 61/674,256, filed on Jul. 20, 2012, provisional application No. 61/783,546, filed on Mar. 14, 2013.

(51) Int. Cl.
*G06F 17/30* (2006.01)

(52) U.S. Cl.
CPC ...... *G06F 17/30979* (2013.01); *G06F 17/3053* (2013.01)

(58) Field of Classification Search
CPC .......... G06F 17/3053; G06F 17/30867; G06F 17/30979
USPC .......................................... 707/748, 749, 750
See application file for complete search history.

(56) References Cited

U.S. PATENT DOCUMENTS

| | | | | |
|---|---|---|---|---|
| 6,405,197 | B2 * | 6/2002 | Gilmour | 707/805 |
| 7,558,769 | B2 | 7/2009 | Scott et al. | |
| 8,606,792 | B1 | 12/2013 | Jackson et al. | |
| 8,612,434 | B2 | 12/2013 | Srikrishna et al. | |
| 8,645,396 | B2 * | 2/2014 | McNally et al. | 707/748 |
| 2008/0275859 | A1 * | 11/2008 | Griffith | 707/4 |
| 2008/0281581 | A1 | 11/2008 | Henshaw et al. | |
| 2010/0191748 | A1 * | 7/2010 | Martin et al. | 707/750 |
| 2010/0198841 | A1 | 8/2010 | Parker et al. | |
| 2012/0265755 | A1 * | 10/2012 | McNally et al. | 707/723 |

OTHER PUBLICATIONS

Georgia Frantzeskou et al., Identifying Authorship by Byte-Level N-Grams: The Source Code Author Profile (SCAP) Method, Spring 2007, vol. 6, Issue 1, Google, 18 pages.*
Vetle I. Torvik et al., A Probabilistic Similarity Metric for Medline Records: A Model for Author Name Disambiguation, Nov. 2004, Google Scholar, 140-158.*

* cited by examiner

*Primary Examiner* — Jean B Fleurantin
(74) *Attorney, Agent, or Firm* — Fish & Richardson P.C.

(57) ABSTRACT

Methods, systems, and apparatus, including computer programs encoded on computer storage media, for associating resources based on resource associations. One of the methods includes receiving a first profile, wherein the first profile is for a first author, wherein the first profile links to one or more first documents, wherein the first author is an author of each of the one or more first documents; identifying, one or more second authors, wherein each of the one or more second authors is a co-author of one or more of the first documents; calculating, respective co-author scores for each of the one or more second authors; ranking, the one or more second authors based on their respective co-author scores; and associating, the one or more second authors with the first profile, the first profile includes a listing of the one or more second authors in an order according to the ranking.

15 Claims, 6 Drawing Sheets

Add Articles

[402] Stephen Hawking    [Search Article Groups]

Article Groups

Stephen W Hawking  } 410
    The large scale structure of space-time  } 412
    SW Hawking... - 1975

Particle creation by black holes  } 414
    SW Hawking – Communications in mathematical physics, 1975

416 [ Add all 427 articles ]   See all articles   } 404

Stephen Hawking
    The Physics of Star Trek
    L Krauss - 2007

On the shoulders of giants: The great works of physics
    S Hawking - 2003

[ Add all 28 articles ]   See all articles   } 406

Stephen Hawking
    NOVA HISTORIA DO TEMPO, UMA:ORIGINAL BRIEFER
    S Hawking... - 2006

L'universo in un guscio di noce
    SW Hawking - 2009

[ Add all 27 articles ]   See all articles   } 408

Stephen Hawking
    A Brief History of Time, 1996
    S Hawking     Sixty years in a nutshell
    S Hawking – The future of theoretical physics and cosmology: ..., 2003

[ Add all 28 articles ]   See all articles   } 408

ASSOCIATING ENTITIES BASED ON RESOURCE ASSOCIATIONS

CROSS-REFERENCE TO RELATED APPLICATIONS

This application claims the benefit of U.S. patent application Ser. No. 61/674,256, filed Jul. 20, 2012 and U.S. patent application Ser. No. 61/783,546, filed Mar. 14, 2013. The entire contents of the prior applications are hereby incorporated by reference.

BACKGROUND

This specification relates generally to associating network accessible resources with entities in the context of digital information retrieval.

A resource can be any type of digital information that is accessible over a network. Examples of resources include network accessible documents, scholarly articles, web pages, videos, audio files, applications, images, books, magazines, news articles, emails, blogs, and patents. Resources typically are linked. One web page, for example, can include a link to another web page. A scholarly article can reference one or more other articles.

An entity represents one or more people and, moreover, can be described by one or more resources. Examples of entities include a particular person, a group of people, one or more groups in a social network, a particular company or groups of companies, and any organization of one or more people. An entity can be either generic, e.g., a U.S. president, or it can be particular, e.g., President George Washington.

A corpus of digital information, examples of which include the Internet and its subset, can contain various types of resources. Moreover, resources typically are or can be associated with one or more entities. For example, scholarly articles available on the Internet are resources that can be associated with their authors, videos are resources that can be associated with the persons who created or posted the videos, images are resources that can be associated with the persons shown in the images, and news articles are resources that can be associated with persons the articles describe.

SUMMARY

This specification describes technologies relating to accurately and comprehensively finding, in a corpus of digital information, resources that are associated with an entity by clustering resources, generating a result list of retrieved and ranked resources, and then selecting one or more clusters based on one or more matching parameters between cluster and list. Additionally, this specification describes technologies relating to identifying associations between or among entities by identifying profiles for entities, determining common resources between or among the entities, and associating entities based on the common resources.

In general, one innovative aspect of the subject matter described in this specification can be embodied in methods that include the actions of receiving a first profile, wherein the first profile is for a first author, wherein the first profile links to one or more first documents, wherein the first author is an author of each of the one or more first documents; identifying, one or more second authors, wherein each of the one or more second authors is a co-author of one or more of the first documents; calculating, respective co-author scores for each of the one or more second authors; ranking, the one or more second authors based on their respective co-author scores; and associating, the one or more second authors with the first profile, the first profile includes a listing of the one or more second authors in an order according to the ranking One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. Calculating a respective co-author score for a second author includes: determining a count of the one or more first documents; determining a recency measure for each of the first documents; determining a popularity measure for each of the first documents; determining an author uniqueness measure for each of the first documents; and calculating the co-author score based on a count of the common documents, the recency measures, the popularity measures, and author uniqueness measures for each of the common documents. Associating the one or more second authors with the first profile includes: associating one or more second authors that each have a respective co-author score that satisfies a threshold, the one or more second authors being ranked in a descending order of the co-authorship score. The method further includes identifying by operation of the system respective second profiles for one or more of the second authors; and updating by operation of the system the listing of the one or more second authors to include links to the respective second profiles.

The subject matter described in this specification can be implemented in particular embodiments so as to realize one or more of the following advantages. Groups of associated resources can be ranked in relation to relevance with an entity. The most relevant groups of associated resources can be easily identified based on the ranking and subsequently associated with the entity. Resources associated with an entity can be automatically updated as groups of associated resources change. A user indicating interest in the entity can be notified of changes to the resources associated with the entity. Entities can also be associated with other entities based on the common resources associated with the entities.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
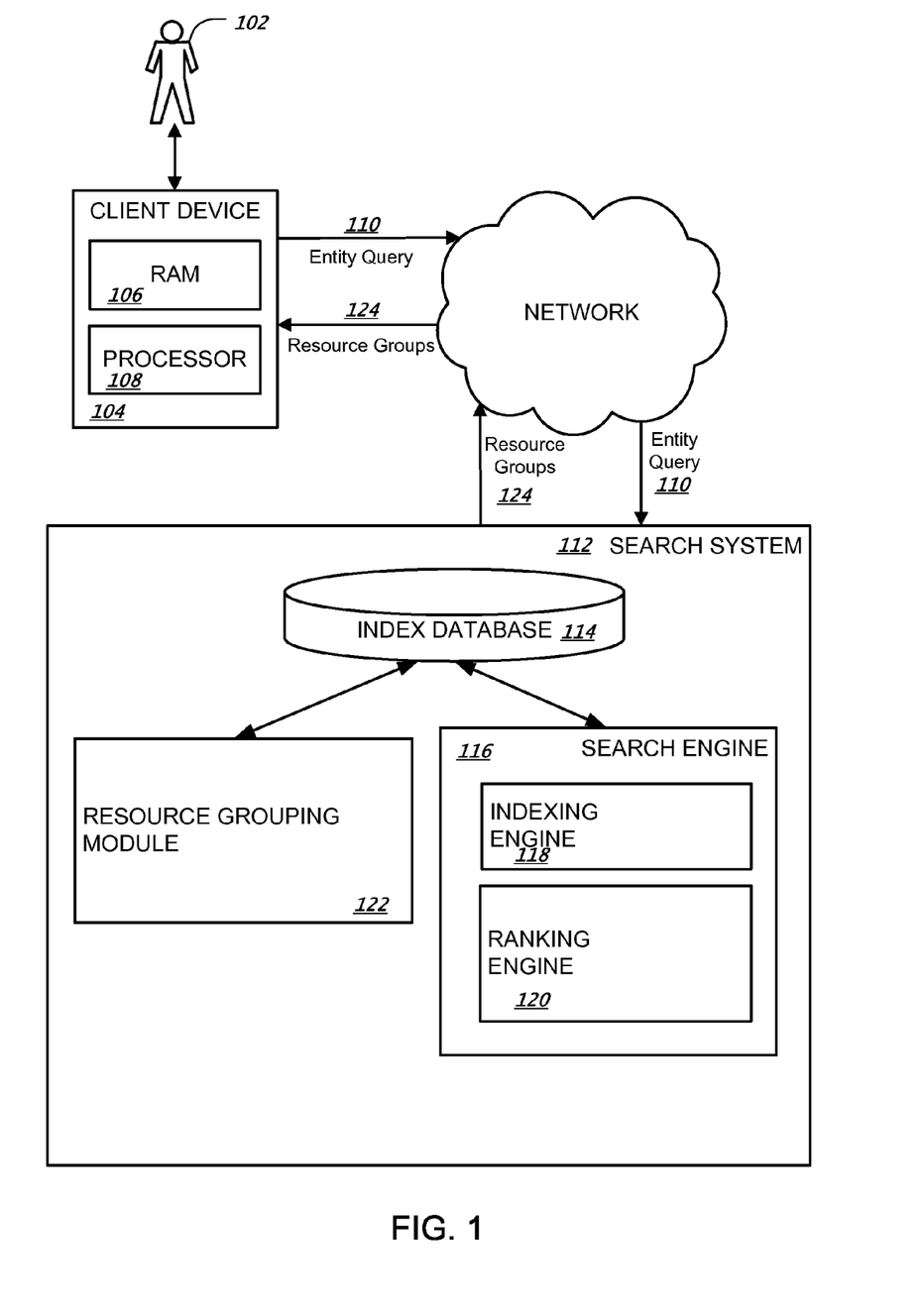
FIG. 1 illustrates an example search system for providing a result list of resources in response to receiving a query that specifies one or more entities.

FIG. 1 illustrates an example search system 112 for providing a result list of resources in response to receiving a query that specifies one or more entities, i.e., an entity query.

The system is suitable for use with an Internet, an intranet, or another client and server environment. The search system 112 is an example of an information retrieval system in which the systems, components, and techniques described below can be implemented.

A user 102 can interact with the search system 112 through a client device 104. As used herein, a user is any natural person. In some implementations, the client device 104 can communicate with the search system 112 over a network. For example, the client device 104 can be a computer coupled to the search system 112 through one or more wired or wireless networks, e.g., mobile phone networks, local area networks (LANs), or wide area networks (WANs), e.g., the Internet. The client device 104 will generally include a random access memory (RAM) 106 and a processor 108, and one or more user interface devices, e.g., a display or a speaker for output, and a keyboard, mouse, microphone, or touch sensitive display for input. In some implementations, the client device 104 can communicate directly with the search system 112. For example, components of the search system 112 and the client device 104 can be implemented on one machine. For example, a user can install a desktop search application on the client device 104. In some implementations, the search system 112 can be implemented as, for example, computer programs running on one or more computers in one or more locations that are coupled to each other through a network.

A user 102 can submit an entity query 110 to search system 112. An entity query is any query that identifies at least one entity. An example entity query is "Noam Chomsky." In some implementations, an entity query includes the proper name of user 102. Here, user 102 is the entity being specified by the query. In some implementations, the entity query includes additional information about the entity. For example, the entity query can also include one or more affiliations or email addresses associated with the entity identified by the entity query. For example, the entity query can include "Massachusetts Institute of Technology," the affiliation associated with entity Noam Chomsky or Noam Chomsky's email address. In other implementations, the query can further include any additional entities of interest. For example, the entity query can further include "American Academy of Arts and Sciences," which Noam Chomsky is a member of. The user 102 can use the one or more user interface devices of the client device 104 to submit the entity query. For example, user 102 can interact with a keyboard or touch sensitive display for input to submit the entity query 110 to a graphical user interface of search system 112. Other methods of submitting queries to search system 112 can also be performed. For example, user 102 can submit the entity query 110 by speaking the query. A microphone associated with client device 104 can detect the query 110 and transmit the query 110 through a network to search system 112.

The search system 112 includes a search engine 116, an index database 114, and a resource grouping module 122.

Search engine 116 identifies resources that are responsive to entity query 110. The search engine 116 will generally include an indexing engine 118 and a ranking engine 120. Indexing engine 118 processes and updates network accessible resources, e.g., documents, web pages, images, or news articles on the Internet, found in a network accessible corpus, e.g., a collection or repository of content, in index database 114 using conventional or other indexing techniques. In some implementations, the index database 114 is a term index of network accessible resources. In some implementations, the index database 114 only contains certain types of resources, e.g., scholarly articles.

The ranking engine 120 uses the index database 114 to identify resources responsive to the query 110, for example, using conventional or other information retrieval techniques. The ranking engine 120 calculates scores for the resources responsive to the query, for example, using one or more ranking signals. Each signal provides information about the resource itself or the relationship between the resource and the query. One example signal is a measure of the overall quality of the resource. Another example signal is a measure of the number of times the terms of the query occur in the resource. Other signals can also be used. For example, the citation counts of documents can be considered in the scoring of the documents. The ranking engine 120 then ranks the responsive resources using the scores.

Resource grouping module 122 programmatically clusters resources in the index database 114 into resource groups. Each resource group is associated with a proper name of an entity. Resource grouping module 122 obtains information describing the ranked resources responsive to the query 110 from search engine 116. Resource grouping module 122 maps the information describing the ranked resources to their respective resources in the resource groups, as described in more detail below with reference to FIG. 3. The resource groups are ranked based on the mapped information.

The search system 112 transmits the ranked resource groups through the network to client device 104. The client device 104 presents the resource groups to the user 102. The resource groups can be presented in order of their respective rankings. A presented resource group describes the resources in the resource group. For example, the presented resource group can include the titles of the resources. Additionally, or alternatively, the presented resource group can contain links to the resources. Other information can be presented for each resource group. For example, the resource group can present the proper name of the entity associated with the resource group. Additionally, or alternatively, a summary of the resources in the presented resource group can also be presented.

The system 112 generates a profile based on a user 102 selection of one or more of the presented resource groups. The user 102 selection can be effected by using one or more user interface devices of the client device 104. In response, a profile is generated that includes the resources from the selected resource groups. A profile is a collection of resources that is associated with a specific entity.

Index database 114 is continuously or periodically updated as new resources are updated to index database 114 by indexing engine 118. Therefore, resource grouping module 122 is continually or periodically clustering the resources into new resource groups as the index database is updated. Resource grouping module 122 identifies profiles that correspond to the new resource groups and adds the resources in the corresponding resource groups to the profiles. Moreover, resource grouping module 122 determines entity associations from profiles for entities. The system can make an association between a first entity and a second entity using heuristics based on, for example, common resources included in their respective profiles. The determined associations can be presented with the profile.

Figure 2:
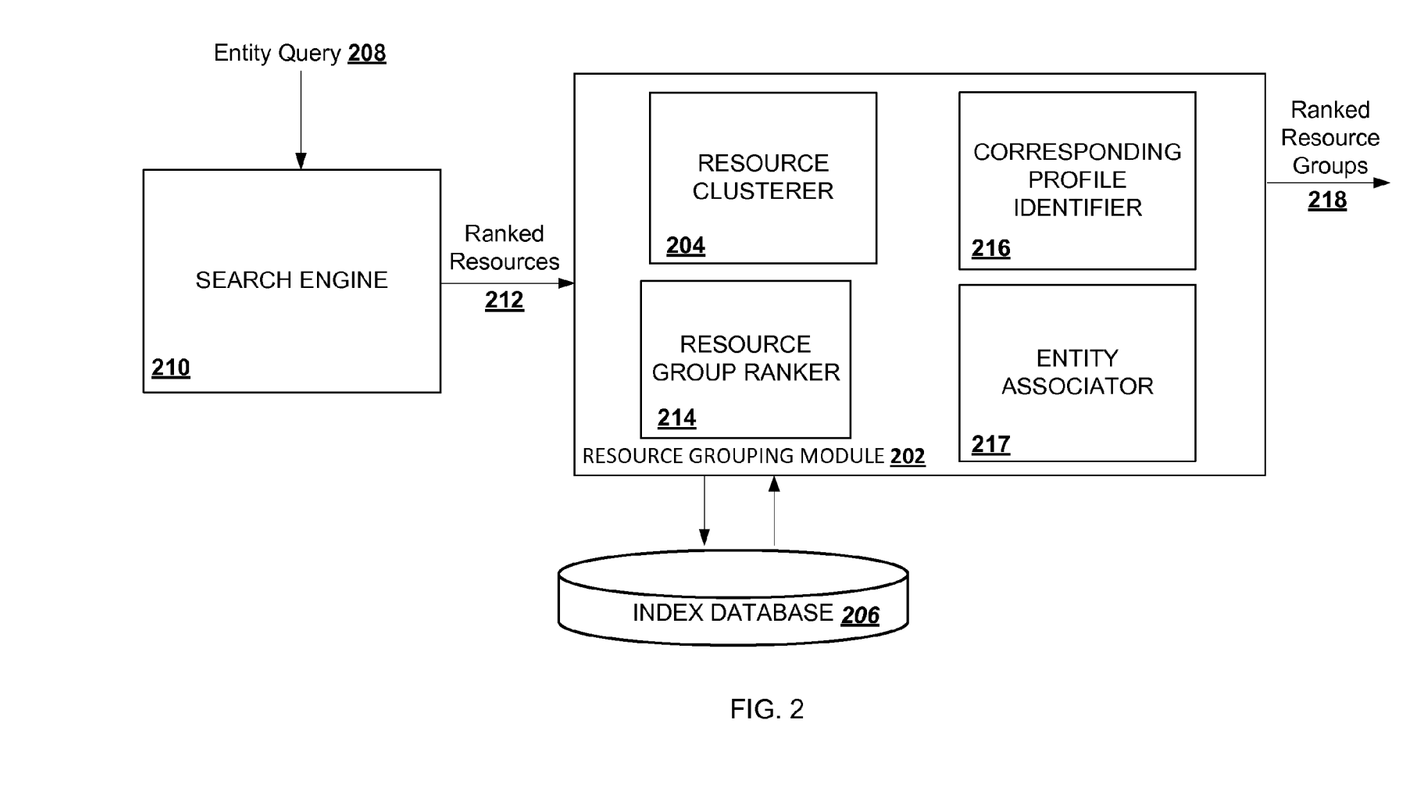
FIG. 2 illustrates an example resource grouping module.

FIG. 2 illustrates an example resource grouping module 202. The example resource grouping module 202 is an example of the resource grouping module 122 described above with reference to FIG. 1.

The resource grouping module 202 includes a resource clusterer 204, resource group ranker 214, corresponding profile identifier 216, and an entity associator 217. The resource grouping module 202 can communicate with index database

206 through one or more wired or wireless networks, e.g., mobile phone networks, local area networks (LANs) or wide area networks (WANs), e.g., the Internet. In some implementations, index database 206 can be an example of the index database 114 described above with reference to FIG. 1. In some implementations, index database 206 can be one or more index databases. Index database 206 can contain a variety of different types of resources, e.g., documents, web pages, images, or news articles on the Internet. Alternatively, the index database 114 can contain one or more specific types of resources, e.g., scholarly articles.

The resource clusterer 204 analyzes the resources in index database 206 and clusters the resources in index database 206 into resource groups, as described in more detail below with reference to FIG. 3.

In response to receiving an entity query 208, search engine 210 generates a list of ranked resources 212 that are responsive to entity query 208, as described in more detail above with reference to FIG. 1. Search engine 210 can be an example of the search engine 116 described above with reference to FIG. 1. Resource grouping module 202 obtains information describing the ranked resources 212 from the search engine 210. Resource group ranker 214 maps the information describing the ranked resources to their respective resources in the resource groups generated by resource clusterer 204. Resource group ranker 214 ranks the resource groups clustered by resource clusterer 204 based on the mapped information, as described in more detail below with reference to FIG. 3. The ranked resource groups 218 can then be provided by the search system to a client device and presented to a user, as described in more detail above with reference to FIG. 1.

The corresponding profile identifier 216 identifies profiles that correspond to resource groups generated by resource clusterer 204, as described in more detail below with reference to FIG. 5. Resources in resource groups that are determined to correspond to a profile are added to the profile by resource grouping module 202.

The entity associator 217 identifies entity associations based on common resources, as described in more detail below with reference to FIG. 6. For example, entity associator 217 can analyze resources in a profile for a particular entity to identify other entities that are also associated with the resources. Entity associator 217 calculates a relationship score between each other entity and the particular entity and determines which other entities are associated with the particular entity based on the relationship scores.

Figure 3:
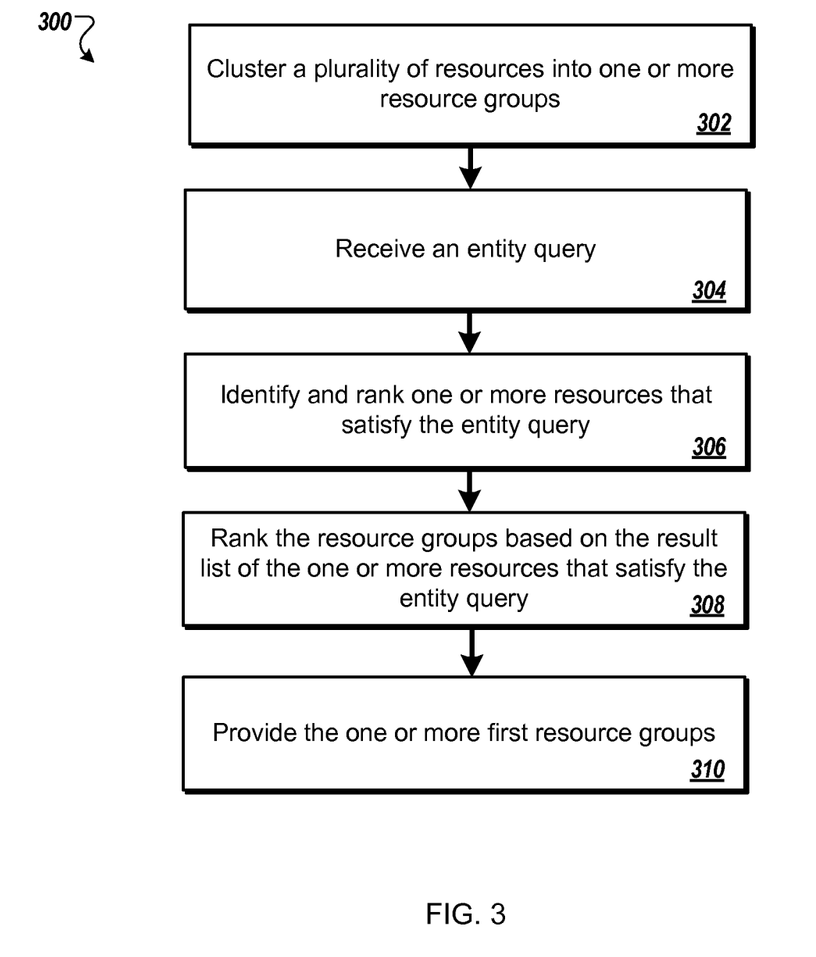
FIG. 3 illustrates an example method for ranking one or more resource groups.

FIG. 3 illustrates an example method for ranking one or more resource groups. For convenience, the example method 300 will be described in reference to a system that performs method 300. The system can be, for example, the search system 112 described above with reference to FIG. 1.

The system clusters a plurality of resources into one or more resource groups (302). Each of the one or more resource groups is associated with a proper name of an entity. In some implementations, the resource groups are clustered on the features of the resources. For example, scholarly articles can be clustered based on features that include the titles of the scholarly articles, the places of publication for the scholarly articles, and proper names of the authors of the scholarly articles. Other features can be used. For example, email addresses associated with the authors and affiliations of the authors can help cluster resources into resource groups. Additionally, scholarly articles can be clustered based on the other documents referenced by the scholarly articles and other documents that reference the scholarly articles. References can be links between the scholarly articles and documents.

Affiliations can be any entity that the author is associated with, e.g., companies, universities, and organizations. The features of the first resources are analyzed to determine associations between the resources. The resources can be clustered into resource groups based on the determined associations between the resources. For example, resources with similar or identical features are clustered into the same resource groups. Resources with different features are clustered into different resource groups.

In some implementations, code implementing a conventional clustering algorithm analyzes the features of the resources to determine which resources to cluster into groups. In general, clustering algorithms well known and currently available would be suitable. Clustering algorithms are available that assigns resources to groups based on a degree of association between the resource and groups. For example, the features for resources can be provided to a clustering algorithm. The clustering algorithm compares the features for the resources and applies the appropriate learned weights to the features. The resulting values are used to calculate association scores between the resources. The resulting values can be combined according to a combination function, for example, the values can be added or multiplied together. Resources with association scores above a predetermined threshold are clustered into the same resource groups.

The system receives an entity query (304), as described above with reference to FIG. 1. For example, the system receives an entity query that includes the proper name of a user submitting the entity query. Alternatively, the entity query can include the proper name of any natural person.

The system identifies and ranks one or more resources that satisfy the entity query (306), as described above with reference to FIG. 1, and generates a result list of the resources. In the list, resources can be ordered according to their respective ranks.

The system ranks the resource groups based on the result list of the one or more resources that satisfy the entity query (308). In some implementations, the system obtains information describing the one or more resources that satisfy the entity query to rank the resource groups. For example, the system maps the resources that satisfy the entity query (i.e., resources referenced in the list) to resources in the resource groups. The mapping can include matching resources that satisfy the entity query to resources in the resource groups to determine the number of matching resources in each of the resource groups. The mapping can be based on different identifiers for the resources, e.g., title, URL, tokens, identification numbers, etc. The number of matching resources can be used to determine the ranking for a particular resource group.

For example, a resource group of scholarly articles that contains ten scholarly articles that are also referenced in the result list is ranked higher than a resource group that contains only eight matching scholarly articles. In some implementations, the ranking of the resource groups can be additionally dependent on a responsiveness of the matching resources to the entity query. For example, the system can obtain a responsiveness level for the matching resource by identifying the ranks or ranking scores calculated by a ranking engine for each of the matched resources in response to the entity query. The number of resources in a particular resource group that match resources that satisfy the entity query can be weighted by the ranks or ranking scores of the matched resources. The ranks or ranking scores of the matched resources can be averaged and weighted against the number of matched resources. For example, a resource group of scholarly articles that contains ten matched scholarly articles with an average ranking score of 0.8 is ranked higher than another resource group that also contains ten matched scholarly articles but with a lower average ranking score for the matched articles.

In some implementations, the ranking of the resource groups can be based on a matching of the proper names of the entities associated with the resource groups and the proper name of the entity that is included in the entity query. Because there are different ways to partition and structure the same proper name, different heuristics are used to restructure the different forms of the same proper name to first identify the closest match for the proper names. For example, in English naming convention, American inventor Thomas Alva Edison can be referred to as "Thomas Edison" or "Edison, T. A." To determine the best match, the proper names are restructured in different variations until the closet match for the proper names is found. Some heuristics include matching the full names as is, matching the names after the different parts in the name have been exchanged, matching the last names and a prefix or abbreviation for the other names, matching a prefix for the last name and an exact or prefix or abbreviated match for the other names. Other heuristics can be used. For example, the above heuristics can be repeated for different partitions of the names or a combination of the described heuristics can be used. In the above example, exchanging the placement of "Thomas" and "Edison." and using an abbreviation for "Thomas" in "Thomas Edison" produces "Edison T," the most similar match to "Edison, T. A."

After the proper names of the entities associated with the resource groups and the proper name of the entity included in the entity query are matched based on an above heuristic, an entity matching score can be calculated for each resource group. The entity matching score is a measure of how similar the matched proper names are. In some implementations, the entity matching score is proportional to the number of characters that match between the two names. Punctuation marks, e.g., periods, commas, can be ignored. Other methods for calculating the entity matching score can be used. For example, the proper name of an entity associated with a resource group and the entity included in the entity query can be partitioned into different components, e.g., last name, first name, and suffix. The partitions for the proper name of the group are matched with the respective partitions for the proper name of the entity query. A partition matching score is calculated for each of the matched partition pairs. The partition matching score for a matched partition pair can be a weighted combination of the length of the partition and the number of characters that match in the partition pair. The entity matching score for the resource group is a weighted sum of the individual partition matching scores. Resource groups can be ranked accordingly to their entity matching scores. For example, resource groups with greater entity matching scores are ranked higher than resource groups with lower entity matching scores.

In some implementations, the ranking of the resource groups is based on the number of matching resources, rank or ranking score for each of the matching resources, and the entity matching score for the respective resource groups. Ranking scores for the resource groups can be calculated using a combination function, e.g., a weighted sum, of the number of matching resources, sum of the ranks or ranking scores for each of the matching resources, and the entity matching score for the respective first resource group. The resource groups can then be ranked according to their respective ranking scores. In some implementations, additional signals can be used to rank the resource groups. For example, the different signals used to rank the resources in response to the entity query can be used.

The system provides the one or more resource groups (310), as described in more detail above with reference to FIG. 1. For example, the one or more resource groups can be provided to a client device, which can then display the resource groups to a user. In some implementations, the resource groups can be displayed in an order based the rankings for the resource groups. For example, resource groups with greater rankings are displayed before the resource groups with lower rankings.

The system can generate profiles that include the resources from the selected resource groups. In some implementations, the system receives a user selection of one or more of the provided resource groups. The selection can be effected, for example, by presenting resource groups in a graphical user interface to the user and prompting selection of resources by the user. In response to receiving the selections, the system generates a profile that includes the resources that are in the selected resource groups. In some implementations, the user can select specific resources in the provided resource groups. In response to receiving the specific resource selections, the system generates a profile that includes the specific selected resources. In other implementations, the system automatically generates a profile without receiving selections from the user. For example, the system can automatically generate a profile with resources from the top n-ranked resource groups, where n is a predetermined integer. For example, the system automatically generates a profile including resources from the three highest ranked resource groups. In some implementations, the generated profiles can be associated with the entity identified in the entity query. For example, the generated profile can be associated with the user, whose proper name is identified in the entity query, that submitted the entity query and selected the resources. Alternatively, the generated profile can be associated with any natural person whose proper name was specified in the entity query.

In some implementations, the system can automatically generate profiles for a list of received proper names. For example, instead of providing the system with an entity query, a user can provide the system with a list of proper names. The system can treat each provided proper name as an individual entity query. The system identifies and ranks resource groups for each of the proper names, as described above. The system can then automatically generate a profile for each of the proper names, using the ranked resource groups for the respective proper names. For example, a profile can be automatically generated for a proper name with resources from the top n-ranked resource groups for the proper name, where n is a predetermined integer.

In some implementations, the user can manually remove resources that the system added to the user's profile. The user can also manually add resources that the system did not include in the user's profile. These removals and additions are feedback signals that suggest that the clustering algorithm used to generate the resource groups selected by the user was inaccurate in the clustering of resources into resource groups. If the user is removing resources, then the statistical model is over-inclusive and associating resources that should not be associated in resource groups. On the other hand, if the user is adding resources, then the statistical model is under-inclusive and not associating resources that should be associated in resource groups. Thus, the clustering algorithm can be modified based on these feedback signals. For example, the removed or added resources can be analyzed to determine common features in the removed or added resources. The clustering algorithm can modify the weights applied to the determined common features. For example, the weights for common features in removed resources can be decreased.

Alternatively, the weights for common features in added resources can be increased. In some implementations, the modified statistical model can be used to generate new resource groups for just the user that generated the feedback signals. In other implementations, the modified statistical model can be used to generate new resource groups for a population of users.

Figure 4:
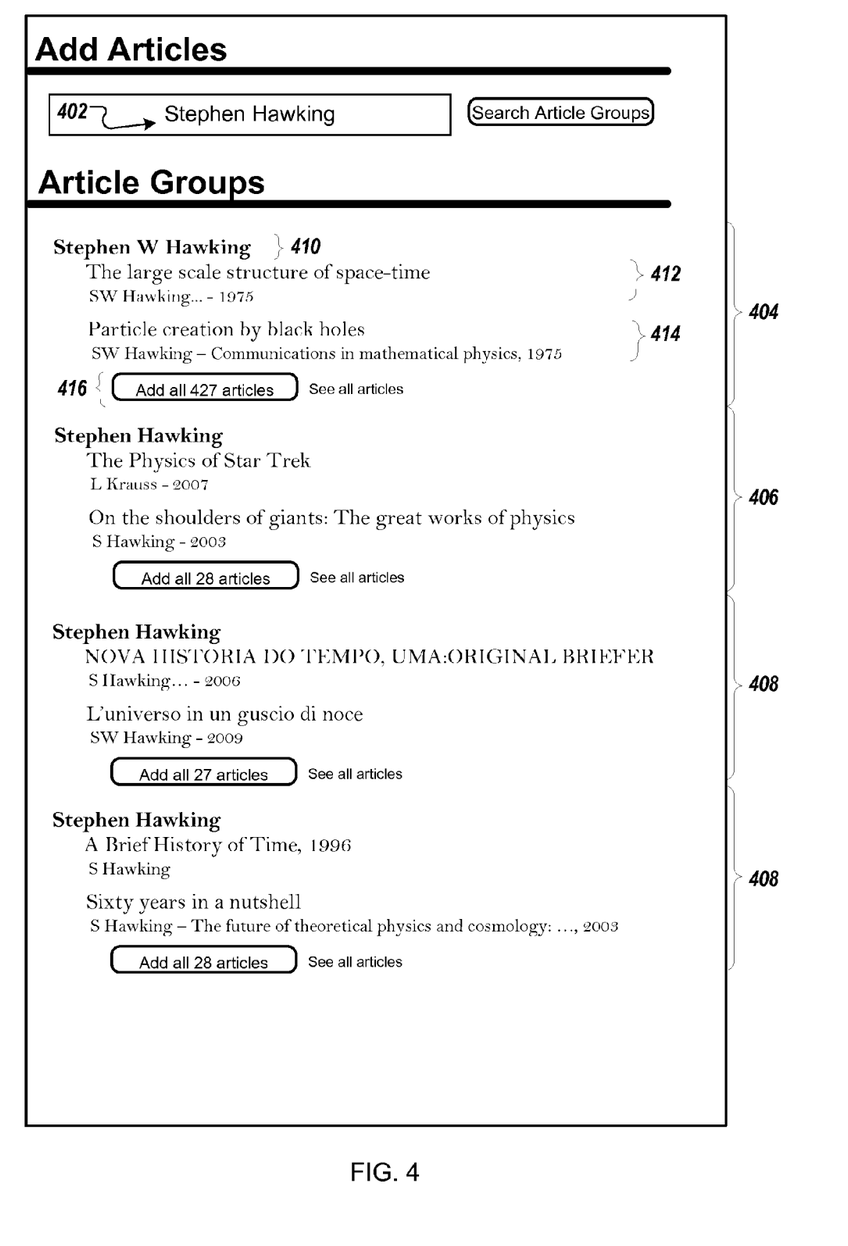
FIG. 4 illustrates an example graphical user interface for generating profiles from resource groups.

FIG. 4 illustrates an example graphical user interface for generating profiles from resource groups. FIG. 4 will be described below in the context of an example implementation of method 300. In this example implementation, a search engine clusters documents in an index database of scholarly articles into document groups. The documents are clustered according to similarities in scholarly articles features, e.g., titles, places of publication, and proper names of authors. Each document group is also associated with an entity associated with the document group, for example, the author of the scholarly articles in the document group.

In FIG. 4, an author submits entity query "Stephen Hawking" 402 to the search engine through the graphical user interface. In some implementations, entity queries can consist of an author's proper name, and other information associated with an author, for example, an author's affiliations and email address.

In response to the query, the search engine identifies documents that satisfy the entity query from the term index database of scholarly articles. The identified documents are used to rank the document groups. A combination function is used to generate a ranking score for each of the document groups. The combination function combines the number of matching documents, the rank or ranking score for each of the matching documents, and the entity matching score for the respective document groups. The document groups are ranked according to their ranking scores and presented in order of the ranking to the author. Document groups 404, 406, 408, and 410 are presented to the author in response to the query "Stephen Hawking" 402. The document groups 404, 406, 408, and 410 are presented in order of their rankings Document group 404 is the top ranked document group and document group 408 is the lowest ranked document group.

Each document group is represented in the graphical user interface. Each group can be represented by the entity the document group is associated with, by example documents from the document group, or both. For example, for document group 404, the displayed associated entity is "Stephen W Hawking" 410, and text describing example documents in document group 404 "The large scale structure of space-time" 412 and "Particle creation by black holes" 414 is displayed. Furthermore, example documents 412 and 414 are presented with additional information, for example, an author list, date of publication, and publication source for the documents.

The author can identify and select the document groups that the author believes should be associated with him. In response to the selection, the system generates a profile for the author, where the profile includes scholarly articles in the selected document groups. For example, the author can identify that document group 404 should be associated with him. The author can select "Add all 427 articles" button 416. In response, all scholarly articles in document group 404 are added to a profile that is generated for the author.

Another example implementation of method 300 is the providing of resources associated with a natural person in a social network. In this example implementation, a search engine clusters resources that are found on one or more social networks or one or more networks, e.g., the Internet. The resources can include photos, videos, songs, news articles, messages, postings, or any other kind of resource that is shared or interacted with on one or more social networks or on the Internet. Resources that are associated with a person are clustered into a resource group. The resource group is further associated with a proper name of the person that is associated with the resources in the resource group. Associations with resources can also include any type of interaction with the resources. Example associations with resources include the uploading, sharing, posting, viewing, listening, and expressing approval of resources. For example, videos that have been watched, songs that have been liked, and messages that have been sent by a person can be clustered into a resource group for the person. As a further example, photos tagged with the person can also be clustered into the resource group for the person.

A user can perform a search for a person of interest. The query can include the proper name of the person of interest. A search engine performs a search for the proper name and identifies resources that satisfy the search query. The identified resources are used to rank the resource groups. A combination function is used to generate a ranking score for each of the document groups. The combination function combines the number of matching resources, the rank or ranking score for each of the matching resources, and the entity matching score for the respective resource groups. The resource groups are ranked according to their ranking scores. In some implementations, the resources in the top ranked resource group are presented to the user. For example, the user is presented with pictures that the person of interested is tagged in, media that the person of interest has viewed, and messages that the person of interest has posted. In other implementations the resources in the top n-ranked resource groups are presented to the user, where n is a non-negative integer.

Figure 5:
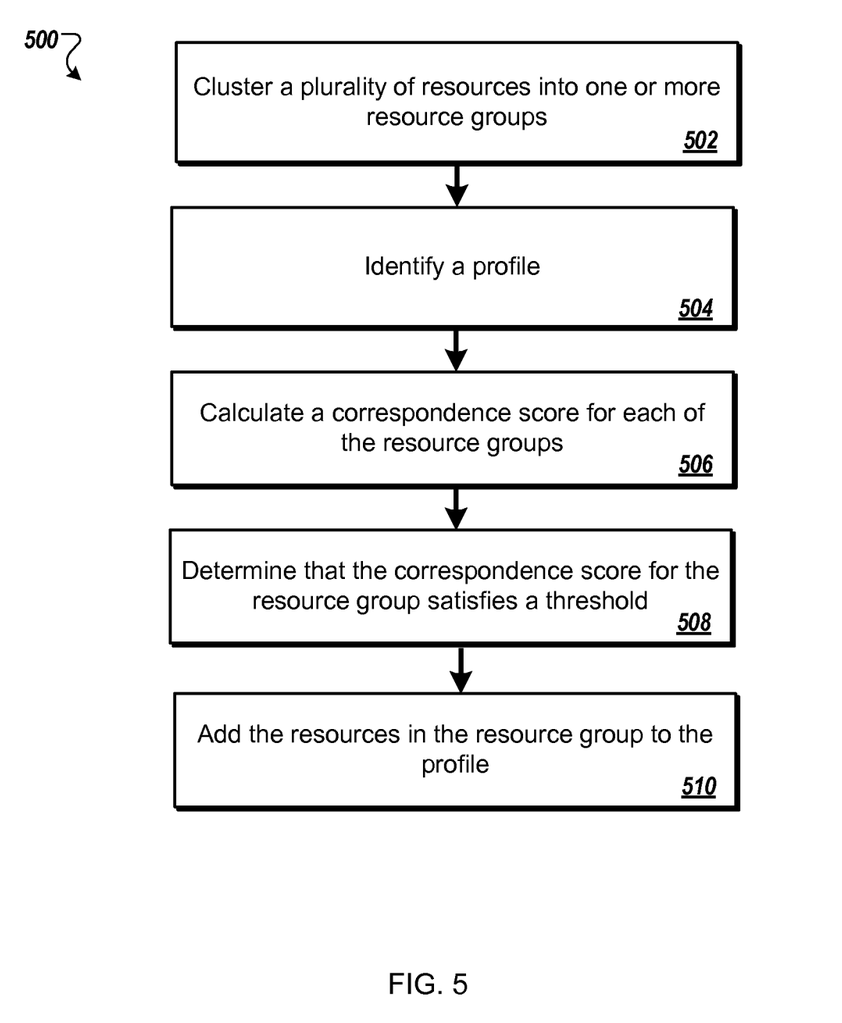
FIG. 5 illustrates an example method for updating resources associated with an entity.

FIG. 5 illustrates an example method for updating resources associated with an entity. For convenience, the example method 500 will be described in reference to a system that performs method 500. The system can be, for example, the search system 112 described above with reference to FIG. 1.

The system clusters a plurality of resources into one or more resource groups (502). A clustering algorithm can analyze the features of the resources to determine which resources to cluster into groups, as described above with reference to FIG. 3.

The system identifies a profile (504). The profile can be associated with an entity that represents a particular natural person. The profile contains one or more resources that are already associated with the entity.

The system calculates a correspondence score for each of the resource groups (506). In some implementations, the system determines a correspondence score between each of the resource groups and the identified profile. The correspondence score for a particular resource group represents a level of correspondence between the resources in the particular resource group and the resources included in the profile. The system determines different signals that the correspondence score for the particular resource group can be derived from. For example, the system can determine the number of resources, $X_1$, that are both in the particular resource group and in the profile. Additionally, the system can determine the number of resources, $X_2$, that are in the particular resource group that have been removed from the profile. Additionally, the system can determine the number of resources, $X_3$, that are in the particular resource group that have never been associated with the profile. Additionally, the system can determine an entity matching score, $X_4$, which represents a level of matching between the proper name of the entity associated with the particular resource group and a proper name of the entity associated with the profile. The method of calculating the entity matching score is described above in reference to FIG. 3. The correspondence score, CS, can be calculated as a function of these different variables. An example function is: $CS=C_1X_1-C_2X_2-C_3X_3$, wherein $C_1$, $C_2$, and $C_3$ are non-negative constants. Other functions can exist. For example: $CS=C_1X_1-C_2X_2-C_3(X_3-C_4)$, wherein $C_4$ is a non-negative constant when $X_4$ satisfies a predetermined threshold or $C_4=0$ when $X_4$ does not satisfy the predetermined threshold.

Resources that are already included in the profile can be found in multiple resource groups. In some implementations, these resources are assigned to one specific resource group when determining the correspondence scores for the different resource groups. For example, these resources are assigned to the specific resource group that maximizes a resource group assignment score. The assignment score, AS, can be calculated as a function of the same above variables. An example function is: $AS=W_1X_4+W_2X_1-W_3X_2-W_4(X_3-W_5X_4)$, wherein $W_1, W_2, W_3, W_4$, and $W_5$ are non-negative constants.

If the system determines that the correspondence score for the particular resource group satisfies a threshold (508), then the system adds the resources in the particular resource group to the profile (510). A subset of the resources in the particular resource group may already be associated with the profile. In some implementations, only those resources that are not already in the profile are added to the profile. In some implementations, entity user can choose to receive profile update notifications. For example, when a profile is updated with new resources, the user interested in the profile, which can be the natural person the entity represents, can be notified of the changes.

An example implementation of method 500 is the addition of scholarly articles to a profile of an author of the scholarly articles. In this example implementation, a search engine clusters documents in an index database of scholarly articles into document groups, as described above with reference to FIG. 3. Each document group is also associated with an entity associated with the document group, for example, the author of the scholarly articles in the document group.

The system then identifies different profiles for different authors. Each profile contains scholarly articles authored by the author that the profile is for. The system determines a correspondence between each of the different profiles and document groups. A correspondence score is calculated for each profile and document group pair. The correspondence score represents a correspondence level between the scholarly articles in the profile and document group. For example, the correspondence score for a profile and document group pair can be calculated from the number of scholarly articles that are in both the document group and profile, the number of scholarly articles that are in the document group but have never been in the profile, and the number of scholarly articles that are in the document group but have been removed from the profile.

Document groups and profiles with correspondence scores that satisfy a threshold are determined to correspond. The scholarly articles in the document groups that correspond to a profile are added to the profile, thereby associating the author associated with the profile with the additional scholarly articles.

Figure 6:
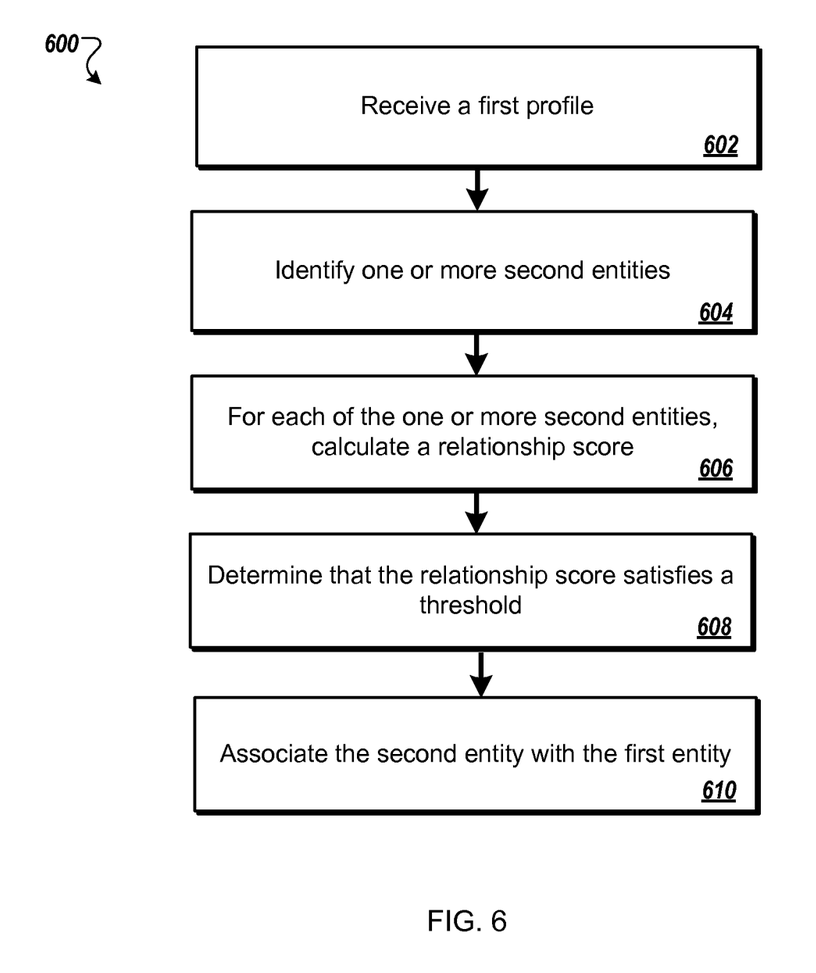
FIG. 6 illustrates an example method for associating entities.

FIG. 6 illustrates an example method for associating entities. For convenience, the example method 600 will be described in reference to a system that performs method 600. The system can be, for example, the search system 112 described above with reference to FIG. 1.

The system receives a first profile (602). The first profile is for a first entity, which in this case represents a particular natural person. The profile is generated in response to an entity query that specifies a proper name for the natural person. The profile is also generated based on user selection of resource groups. The first profile additionally includes references to one or more resources. The profile can include the proper name of the natural person and references to one or more resources that are associated with the natural person. References to resources can be generated for the profile and associated with the natural person as described above with reference to FIG. 3 and FIG. 5.

The system identifies one or more second entities (604). The second entities are, at this point, proper names, and can represent natural persons. Each of the second entities is associated with resources, as described above with references to FIG. 3 and FIG. 5. Each second entity is associated with at least one resource that is also associated with the first entity. In some implementations, the second entities are identified from the resources that are associated with the first entity. For example, the system can analyze the resources in the profile for the first entity. The system can determine additional entities that the resources are associated with and identify these additional entities as second entities.

The system calculates a relationship score for each of the second entities (606). In some implementations, the system calculates a relationship score between each of the second entities and the first entity. The relationship score represents a relationship measure between the first entity and second entities. The relationship is determined from the resources associated with the first entity and the resources associated with each of the second entities. The system determines different signals that the relationship score for a particular second entity can be derived from. One such signal is the number of resources that is associated with both the first entity and the particular second entity. For example, the greater the number of common resources that is associated with both the first entity and the particular second entity, the greater the relationship score for the particular second entity.

Another signal is a recency of the common resources that are associated with both the first entity and the particular second entity. The recency for a particular resource is a measurement of how recent an event associated with the particular resource occurred. For example, the recency for a document can be measured by the amount of time that has elapsed since the document was created or published. As a further example, the recency for a video can be measured by the number of days that has elapsed since the video was last watched. In some implementations, the recency for the common resources can be averaged. For example, the number of days that has elapsed for each of common resources can be averaged. The average can then be weighted against the number of the resources that are associated with both the first entity and the particular second entity. In some implementations, the more recent the resources, the greater the relationship score for the particular second entity. For example, a particular second entity that is associated with ten common resources with an average recency of ten days is given a greater relationship score than a second entity that is associated with the same ten common resources with an average recency of eleven days. In other implementations, the more recent the resources, the lesser the relationship score for the particular second entity. For example, a particular second entity that is associated with ten common resources common with an average recency of ten days is given a lesser relationship score than a second entity that is associated with the same ten common resources with a greater average recency of eleven days.

An additional signal is a popularity of the common resources that are associated with both the first entity and the particular second entity. The relationship score for a particular second entity can be based on a popularity of each of the common resources with the first entity. The popularity can be a measure of the number of interactions that have occurred with the common resources. For example, the popularity of a video can be measured by the number of times the video has been viewed. As a further example, the popularity of a document can be measured by the number of times that the document has been referred to or cited. In some implementations, the greater the popularity of the common resources for the particular second entity, the greater the relationship score for the particular second entity.

A further signal is a uniqueness of the common resources that are associated with both the first entity and the particular second entity. In some implementations, the number of entities that are associated with the common resources can measure the uniqueness of a common resource. For example, a common resource that is associated with multiple entities is a weaker indicator of a relationship between a particular second entity and the first entity than a common resource that is associated with only the particular second entity and the first entity. The less entity associations for the common resources between the first entity and the particular second entity, the stronger the indication that the particular second entity and the first entity are related. Therefore, the second entities with unique common resources have greater relationship scores.

In some implementations, the relationship score for each of the second entities can be calculated by combining the different respective signals described above using a combination function. If the system determines that the relationship score for the particular second entity satisfies a threshold (608), then the system associates the second entity with the first entity (610). In some implementations, each of the second entities with relationship scores that satisfy the threshold is added to the profile for the first entity.

In some implementations, after a relationship score is calculated for each of the second entities, the second entities are ranked based on their relationship scores. The system provides the ranked entities so that they are added to the profile for the first entity, thereby associating the first entity with the added second entities. The user and other users can access the profile through a graphical user interface provided by the system. The profile can include information describing the resources associated with the first entity, as well as information describing the second entities that have been associated with the first entity. The second entities can be provided with the profile for the first entity in order of the ranking. For example, the top-ranked second entity is presented first, while the lowest-ranked second entity is presented last. In some implementations, only the top n-ranked second entities are added to the profile and associated with the first entity.

In some implementations, the system determines whether the second entities have profiles of their own. The system can identify whether profiles already exist for the second entities in the system. For example, the system can calculate a name matching score, as described above with reference to FIG. 3, between the proper name of a second entity and the proper names associated with existing profiles to determine if a profile already exists in the system for the second entity. Other methods of verifying if a profile exists for a second entity can be used. For example, an email address associated with the second entity can be matched with email addresses associated with existing profiles. If a second entity is determined to have an existing profile, the information describing the second entity in the first profile can further include a link to its respective profile. In some implementations, only those second entities determined to have profiles are presented with the profile for the first entity.

An example implementation of method 600 is the association of authors of scholarly articles with other authors. For example, scholarly article authors can be associated with co-authors of articles that they have written together. In this example implementation, the system identifies a first profile for an author. The first profile can be identified from existing author profiles. The author profile for the first author contains information describing scholarly articles that have been associated with the first author. These scholarly articles can be articles naming the first author as an author.

The system then identifies one or more second authors. In some implementations, the one or more second authors are identified from the author profile for the first author. For example, the system can analyze the scholarly articles associated with the profile for the first author and identify additional authors that have co-authored the scholarly articles with the first author. Scholarly articles are often formatted in the same manner, e.g., title and list of authors at the top, citations and references at the bottom, etc. Trained algorithms can be used to parse the scholarly article documents to identify named co-authors for the scholarly articles.

The system calculates a co-author score for each of the second authors. The co-author score is a measure of the relationship between a second author and the first author.

For example, the relationship can be a measure of how connected a particular second author and the first author are as co-authors. In some implementations, the co-author score is derived from signals that indicate the co-author relationship between a particular second author and the first author. The signals can include the number of common scholarly articles that are associated with both the particular second author and the first author. This signal can be determined from the scholarly articles that are in the profile for the first author. The system can determine the number of scholarly articles that list both the particular second author and the first author as authors. The signals can further include a recency measure for each of the common scholarly articles. The recency measure can be a time measurement of the amount of time that has elapsed since an event associated with a scholarly article. For example, the recency measure for a scholarly article can be the number of days since the article was written or published. The signals can further include an author uniqueness measure for each of the common scholarly articles. The author uniqueness measure represents the number of authors that are associated with a common scholarly article. The smaller the number of authors associated with a scholarly article, the greater the uniqueness measure for the article. The signals can additionally include a popularity measure for each of the common scholarly articles. The popularity measure can represent the number of times that a common scholarly article has been referred to, e.g., the number of citations that a common scholarly article has received. The different signals for each second author can be combined using a combination function to calculate co-author scores for the respective second authors.

The second authors can be ranked based on their respective co-author scores. For example, the second author with the greatest co-author score is ranked the highest while the second author with the least co-author score is ranked the lowest. The second authors are then presented in the order of the ranking. In some implementations, the second authors are presented with the profile for the first author. For example, the second authors can be listed in order of their ranking and identified as co-authors with the first author in the profile for the first author. In some implementations, only the top n-ranked second authors are presented. For example, the profile for the first author can present just the five top ranked second authors as co-authors.

In some implementations, the system can determine whether the second authors are associated with profiles of their own. The system can identify profiles for second authors by matching the proper names of the second authors with the proper names of authors associated with existing profiles. The existing profiles can be stored in a database containing profiles for scholarly article authors. If a presented second author is determined to have an existing associated profile, then a link can be provided to the associated profile. For example, the list of co-authors presented with a profile associated with the first author can include links to the profiles of the co-authors with associated profiles.

An electronic document, which for brevity will simply be referred to as a document, may, but need not, correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
receiving a first profile in a system comprising one or more computers, wherein the first profile is for a first author, wherein the first profile links to one or more first documents, wherein the first author is an author of each of the one or more first documents;
identifying by operation of the system, one or more second authors, wherein each of the one or more second authors is a co-author of one or more of the first documents;
calculating by operation of the system and for each of the one or more second authors, a respective co-author score for the second author that is a measure of how connected the second author and the first author are as co-authors;
ranking by operation of the system, the one or more second authors based on their respective co-author scores;
associating by operation of the system, the one or more second authors with the first profile;
receiving a request from a user to access a profile for the first author; and
providing the first profile for presentation to the user, wherein, when presented to the user, the first profile includes a result list of retrieved and ranked resources associated with the first author and a listing of the one or more second authors in an order according to the ranking of the one or more second authors.

2. The method of claim 1, wherein calculating a respective co-author score for each of the second authors comprises:
determining a count of co-authored documents, wherein the co-authored documents are first documents that have both the first author and the second author as authors;
determining a recency measure for each of the co-authored documents that measures how recently the co-authored document was written or published;
determining a popularity measure for each of the co-authored documents;
determining an author uniqueness measure for each of the co-authored documents from a total number of co-authors for the co-authored document; and
calculating the co-author score based on the count of the co-authored documents, the recency measures, the popularity measures, and author uniqueness measures for each of the co-authored documents.

3. The method of claim 2, wherein calculating the co-author score based on the count of the co-authored documents, the recency measures, the popularity measures, and author uniqueness measures for each of the co-authored documents comprises:
combining the count of the co-authored documents, the recency measures, the popularity measures, and the author uniqueness measures for each of the co-authored documents using a combination function to determine the co-author score for the second author.

4. The method of claim 1, wherein associating the one or more second authors with the first profile comprises:
adding data identifying one or more second authors that each have a respective co-author score that satisfies a threshold, the one or more second authors being ranked in a descending order of the co-authorship score.

5. The method of claim 1, further comprising:
identifying by operation of the system respective second profiles for one or more of the second authors; and
updating by operation of the system the listing of the one or more second authors to include links to the respective second profiles.

6. A system, comprising:
one or more computers configured to perform operations comprising:
receiving a first profile in a system comprising one or more computers, wherein the first profile is for a first author, wherein the first profile links to one or more first documents, wherein the first author is an author of each of the one or more first documents;

identifying by operation of the system, one or more second authors, wherein each of the one or more second authors is a co-author of one or more of the first documents;

calculating by operation of the system and for each of the one or more second authors, a respective co-author score for the second author that is a measure of how connected the second author and the first author are as co-authors;

ranking by operation of the system, the one or more second authors based on their respective co-author scores;

associating by operation of the system, the one or more second authors with the first profile;

receiving a request from a user to access a profile for the first author; and providing the first profile for presentation to the user, wherein, when presented to the user, the first profile includes a result list of retrieved and ranked resources associated with the first author and a listing of the one or more second authors in an order according to the ranking of the one or more second authors.

7. The system of claim 6, wherein calculating a respective co-author score for each of the second authors comprises:

determining a count of co-authored documents, wherein the co-authored documents are first documents that have both the first author and the second author as authors;

determining a recency measure for each of the co-authored documents that measures how recently the co-authored document was written or published;

determining a popularity measure for each of the co-authored documents;

determining an author uniqueness measure for each of the co-authored documents from a total number of co-authors for the co-authored document; and calculating the co-author score based on the count of the co-authored documents, the recency measures, the popularity measures, and author uniqueness measures for each of the co-authored documents.

8. The system of claim 7, wherein calculating the co-author score based on the count of the co-authored documents, the recency measures, the popularity measures, and author uniqueness measures for each of the co-authored documents comprises:

combining the count of the co-authored documents, the recency measures, the popularity measures, and the author uniqueness measures for each of the co-authored documents using a combination function to determine the co-author score for the second author.

9. The system of claim 6, wherein associating the one or more second authors with the first profile comprises:

adding data identifying one or more second authors that each have a respective co-author score that satisfies a threshold, the one or more second authors being ranked in a descending order of the co-authorship score.

10. The system of claim 6, wherein the operations further comprise:

identifying respective second profiles for one or more of the second authors; and updating the listing of the one or more second authors to include links to the respective second profiles.

11. A non-transitory computer storage medium encoded with a computer program, the program comprising instructions that when executed by one or more computers cause the one or more computers to perform operations comprising:

receiving a first profile in a system comprising one or more computers, wherein the first profile is for a first author, wherein the first profile links to one or more first documents, wherein the first author is an author of each of the one or more first documents;

identifying by operation of the system, one or more second authors, wherein each of the one or more second authors is a co-author of one or more of the first documents;

calculating by operation of the system and for each of the one or more second authors, a respective co-author score for the second author that is a measure of how connected the second author and the first author are as co-authors;

ranking by operation of the system, the one or more second authors based on their respective co-author scores;

associating by operation of the system, the one or more second authors with the first profile;

receiving a request from a user to access a profile for the first author; and providing the first profile for presentation to the user, wherein, when presented to the user, the first profile includes a result list of retrieved and ranked resources associated with the first author and a listing of the one or more second authors in an order according to the ranking of the one or more second authors.

12. The computer storage medium of claim 11, wherein calculating a respective co-author score for each of the second authors comprises:

determining a count of co-authored documents, wherein the co-authored documents are first documents that have both the first author and the second author as authors;

determining a recency measure for each of the co-authored documents that measures how recently the co-authored document was written or published;

determining a popularity measure for each of the co-authored documents;

determining an author uniqueness measure for each of the co-authored documents from a total number of co-authors for the co-authored document; and calculating the co-author score based on the count of the co-authored documents, the recency measures, the popularity measures, and author uniqueness measures for each of the co-authored documents.

13. The computer storage medium of claim 12, wherein calculating the co-author score based on the count of the co-authored documents, the recency measures, the popularity measures, and author uniqueness measures for each of the co-authored documents comprises:

combining the count of the co-authored documents, the recency measures, the popularity measures, and the author uniqueness measures for each of the co-authored documents using a combination function to determine the co-author score for the second author.

14. The computer storage medium of claim 11, wherein associating the one or more second authors with the first profile comprises:

adding data identifying one or more second authors that each have a respective co-author score that satisfies a threshold, the one or more second authors being ranked in a descending order of the co-authorship score.

15. The computer storage medium of claim 11, wherein the operations further comprise:

identifying respective second profiles for one or more of the second authors; and updating the listing of the one or more second authors to include links to the respective second profiles.

* * * * *